United States Patent
Lynch et al.

(10) Patent No.: US 9,137,638 B1
(45) Date of Patent: Sep. 15, 2015

(54) LOGICAL TO PHYSICAL MAPPING OF WIRELESS NETWORK COMPONENTS

(71) Applicant: SIMMONDS PRECISION PRODUCTS, INC., Vergennes, VT (US)

(72) Inventors: Michael A. Lynch, Shelburne, VT (US); Garret Edward Rittenhouse, Burlington, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 9 days.

(21) Appl. No.: 14/260,092

(22) Filed: Apr. 23, 2014

(51) Int. Cl.
*H04W 24/00* (2009.01)
*H04W 4/02* (2009.01)
*H04W 64/00* (2009.01)

(52) U.S. Cl.
CPC ............ *H04W 4/027* (2013.01); *H04W 64/003* (2013.01)

(58) Field of Classification Search
CPC ....... H04W 64/00; H04W 4/02; H04W 84/18; G06K 19/0723
USPC ........ 455/7, 11.1, 427–431, 13.1, 456.1, 420, 455/418–419
See application file for complete search history.

(56) References Cited

U.S. PATENT DOCUMENTS 7,812,718 B1 * 10/2010 Chan et al. ............... 340/539.13
8,253,684 B1 * 8/2012 Lloyd ........................... 345/156

* cited by examiner

*Primary Examiner* — Babar Sarwar

(57) ABSTRACT

A system for evaluating a physical location of a node in a network comprising a multi-axis accelerometer installed in proximity to the node and in a deterministic spacial orientation, and/or a controller configured to receive an acceleration vector associated with the multi-axis accelerometer and to evaluate the orientation of the node based on the received acceleration vector in comparison to a reference acceleration vector known to the controller and a look-up table in memory configured to contain the logical function and a node location identifier for each spatial orientation. The node may comprise a system component.

17 Claims, 5 Drawing Sheets

US 9,137,638 B1

LOGICAL TO PHYSICAL MAPPING OF WIRELESS NETWORK COMPONENTS

FIELD

The present disclosure relates to locating wireless network components, and more particularly, to locating such components based upon the acceleration vector of a sensor in space.

BACKGROUND

Aircraft systems include a variety of components (e.g., overhead lights). These components may be coupled to each other in a variety of ways (e.g., point-to-point, bussed network topology, etc.) As more electric systems are used on new aircraft, new wiring is added and the overall weight of the aircraft may increase as a result. Bussed network architectures often offer a lighter weight alternative than point-to-point, but in these systems, it will be necessary to determine the physical location of each component on the bus. In addition, the labor required to identify the physical location of each component during initial installation or replacement may be burdensome and prone to error.

SUMMARY

A system for evaluating a physical location of a node in a network comprising a multi-axis accelerometer installed in proximity to the node and in a deterministic spacial orientation, and/or a controller configured to receive an acceleration vector associated with the multi-axis accelerometer and to evaluate the orientation of the node based on the received acceleration vector in comparison to a reference acceleration vector known to the controller and a look-up table in memory configured to contain the logical function and a node location identifier for each spatial orientation. The node may comprise a system component. The controller may request, at least one of: an identifier associated with the node, a logical function of the node, and an acceleration vector of the accelerometer. The system controller may develop a map of a plurality of locations of a plurality of nodes within a network in relation to one another. The controller may determine, based upon a change in the mapping, that a node has been at least one of: installed, replaced, damaged, or moved. The memory may store a logical function of the node. The accelerometer may measure its acceleration vector relative to a motion of an object to which it is mechanically coupled. When there is no acceleration of the object, the accelerometer may measure its acceleration vector relative to the force of gravity.

The system may further comprise a plurality of nodes with accelerometers, each mounted in a unique spacial orientation relative to the remaining plurality. An accelerometer may be electrically coupled to a node. An accelerometer may comprise a portion of a node. Each node may communicate wirelessly with the controller. The system may further comprise receiving by the controller, at least one of: an identifier associated with the node, a logical function of the node, or an acceleration vector of the accelerometer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1C:
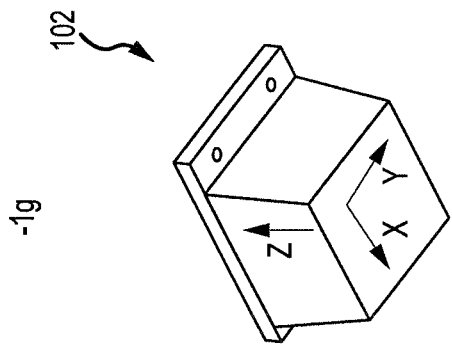
FIG. 1C illustrates, in accordance with various embodiments, a 3-axis accelerometer having a third orientation in space, wherein in the third orientation, the accelerometer is configured to detect an acceleration vector with a magnitude of 1 g and a direction determined by x, y and z axis vectors that is different than that of FIG. 1A and FIG. 1B and a −1 g acceleration in the z-axis.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

In a point-to-point wired electrical system (a lighting system for example), a dedicated wired connection may uniquely identify the logical function and/or physical location of each system module, sensor, actuator, and the like at the termination of the wire. However, in a bussed network topology, a wired connection may be shared by multiple systems. Additional data may be required, within a bussed topology, to determine the physical location of components on the bus. For example, systems may be manually placed and their locations along the bus recorded by an installer, such as an individual tasked with the installation of such components.

Systems such as those described above may be installed on passenger aircraft, where it is common that there are many installations of many identical components of a particular system (e.g., an overhead reading lamp comprising the lamp and a switch to turn the lamp on and off) throughout the aircraft. Although a point-to-point system would clearly identify which light corresponds to which switch, it may require significant wiring if the switches are located, for example, on the seats for the convenience of passengers. If the lamps and switches (or other components) are installed in a bussed network, wire weight may be saved; however, the correlation between a particular light and a particular switch would be unclear unless an individual or installer manually or physically mapped, as described above, the location of each component.

This effort to match each component with its location (e.g., each lamp with its switch) during installation and replacement of such components often requires significant investment in labor. This labor investment may, very often, offset the benefits of reducing weight and complexity by the utilization of a bussed network. Accordingly, it would be highly desirable to construct a low-cost, automated system for self-identification of bussed components to determine their logical to physical mapping (i.e., to determine where they reside physically on the aircraft versus their logical address on the bus).

Figure 1B:
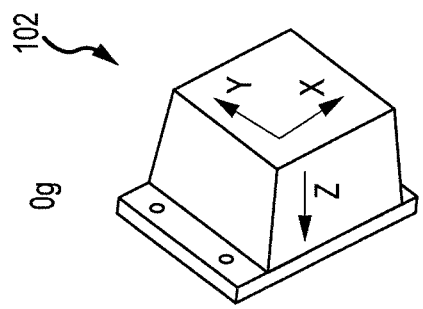
FIG. 1B illustrates, in accordance with various embodiments, a 3-axis accelerometer having a second orientation in space, wherein in the second orientation, the accelerometer is configured to detect an acceleration vector with a magnitude of 1 g and a direction determined by x, y and z axis vectors that is different than that of FIG. 1A and a 0 g acceleration in the z-axis.
Figure 1A:
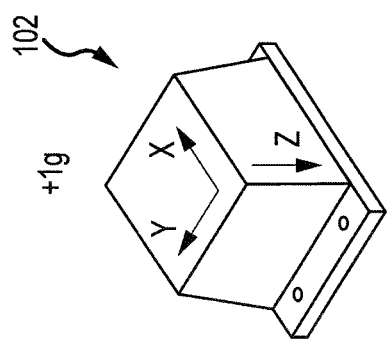
FIG. 1A illustrates, in accordance with various embodiments, a 3-axis accelerometer having a first orientation in space, wherein in the first orientation, the accelerometer is configured to detect an acceleration vector with a magnitude of 1 g and a direction determined by x, y and z axis vectors and a 1 g acceleration in the z-axis.

With reference to FIGS. 1A, 1B, and 1C, a 3-axis accelerometer 102 is shown in three different orientations. For simplicity as well as purposes of illustration, this example describes a single-axis of acceleration to uniquely identify three different node mounting orientations. Each orientation is shown relative to the force of gravity (+1 g in a direction of the z-axis in FIG. 1A, 0 g in the direction of the z-axis in FIG. 1B, and −1 g in the direction of the z-axis in FIG. 1C), and the accelerometer 102 may be configured to detect an acceleration relative to the force of gravity as desired. So, for example, in the orientation shown in FIG. 1A, the accelerometer 102 may detect an acceleration due to the force of gravity of +1 g. Similarly, in the orientation depicted at FIG. 1B, the accelerometer 102 may be configured to detect an acceleration due to the force of gravity of 0 g, while in the orientation depicted at FIG. 1C, the accelerometer 102 may be configured to detect an acceleration due to the force of gravity of −1 g.

These orientations are merely examples, however, and the accelerometer 102 may be oriented in any suitable manner. For a 3-axis accelerometer, a conversion from a Cartesian vector (x, y, z) to a spherical vector (e.g., radius r, inclination θ, azimuth φ or similar) may be calculated by the controller 202 as required and/or desired. As used herein, any network component, as described above, comprising an accelerometer may be described as a "network node" or "node." Any node, including the controller 202, may be designated as a reference node. A reference node may, in various embodiments, comprise a node having an accelerometer having a known orientation to which other node orientations may be compared.

In various embodiments, The radius of the spherical vector may represent the acceleration vector magnitude (r), which may likely be similar for all nodes rigidly mounted on an object which is at rest (due to the acceleration of gravity) and/or accelerating in a linear direction. The acceleration vector's inclination and azimuth (θ and/or φ) may identify the node's apparent acceleration direction in three dimensional space. Conversion of Cartesian to spherical calculations are well known by those skilled in the art, and so are not described further herein.

For simplicity, an "acceleration vector" may be described herein in spherical coordinate notation (as described above), and the direction (as opposed to the magnitude) of the acceleration vector in three-dimensional space may be referred to herein as the "orientation" of a network node. However, in reporting acceleration to the network controller 202, a node may report either Cartesian or spherical values.

The acceleration vector of the object (e.g., an aircraft) may vary when the object is in motion. Therefore, it is important to identify the orientation of each node relative to the orientation of the reference node. As described above, any single node containing a 3-axis accelerometer may be designated as the reference node.

The acceleration vector measured by a node's accelerometer may be compared to the reference node's acceleration vector to provide a relative orientation of the node with respect to the reference node. Since each node's acceleration vector may change rapidly when the node is in motion, measurements of the reference accelerometer and other node accelerometers may be time synchronous and orientation data may be valid only if the radial acceleration value exceeds a predetermined value, such as for example between 0 g and 1 g. Synchronization may not be necessary if the node is at rest. Mounting orientation of the accelerometer 102 may be arbitrary and may be configured as desired so long as the nodes have unique orientations.

Figure 2:
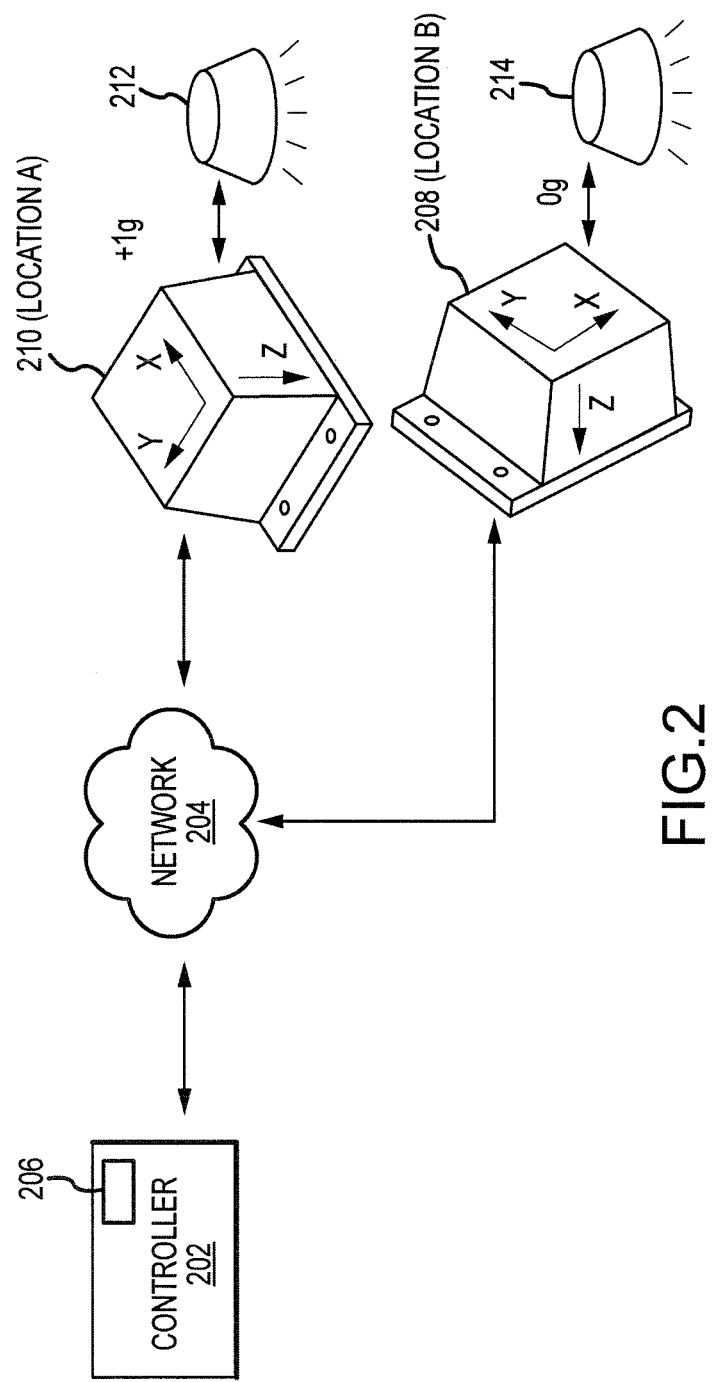
FIG. 2 illustrates, in accordance with various embodiments, a network of nodes with 3-axis accelerometers in close proximity or contained within the nodes, coupled to a network controller.

With regard to FIG. 2, the nodes 212 and 214 may be wirelessly coupled, such as via a wireless network 204 (or coupled via a wired bus connection) to a controller, processor, or computer-based system 202. The accelerometers 208 and 210 may be further coupled with, co-located with, and/or part of various system components, which may be referred to herein, as described above, as "nodes," 212 and 214 such as a reading lamp and switch.

The controller 202 may, in various embodiments, comprise any system and/or article of manufacture, for example, a processor, and may include a non-transitory, tangible computer readable medium such as memory 206 having instructions stored thereon that, in response to execution by a controller, cause the controller to perform operations and/or processes as described herein. The memory 206 may be coupled to the controller 202 through logical and/or electrical communication. In various embodiments, controller 202 comprises memory 206.

Memory 206 may comprise a lookup table or database of known or programmed locations, orientations and logical data of one or more nodes 212 and/or 214. The database residing within the memory 206 may further comprise an identifier ("ID") variable to be retrieved from a node 212 and/or 214. Moreover, the database residing within the memory 206 may associate a variety of logical data (such as functional data associated with each node).

An example database residing within the memory 206 may, for illustrative purposes, resemble the following:

| Node ID 1 | Orientation 1 | Location ID 1 | Logical Data 1 |
| Node ID 2 | Orientation 2 | Location ID 2 | Logical Data 2 |
| Node ID 3 | Orientation 3 | Location ID 3 | Logical Data 3 |

Figure 3:
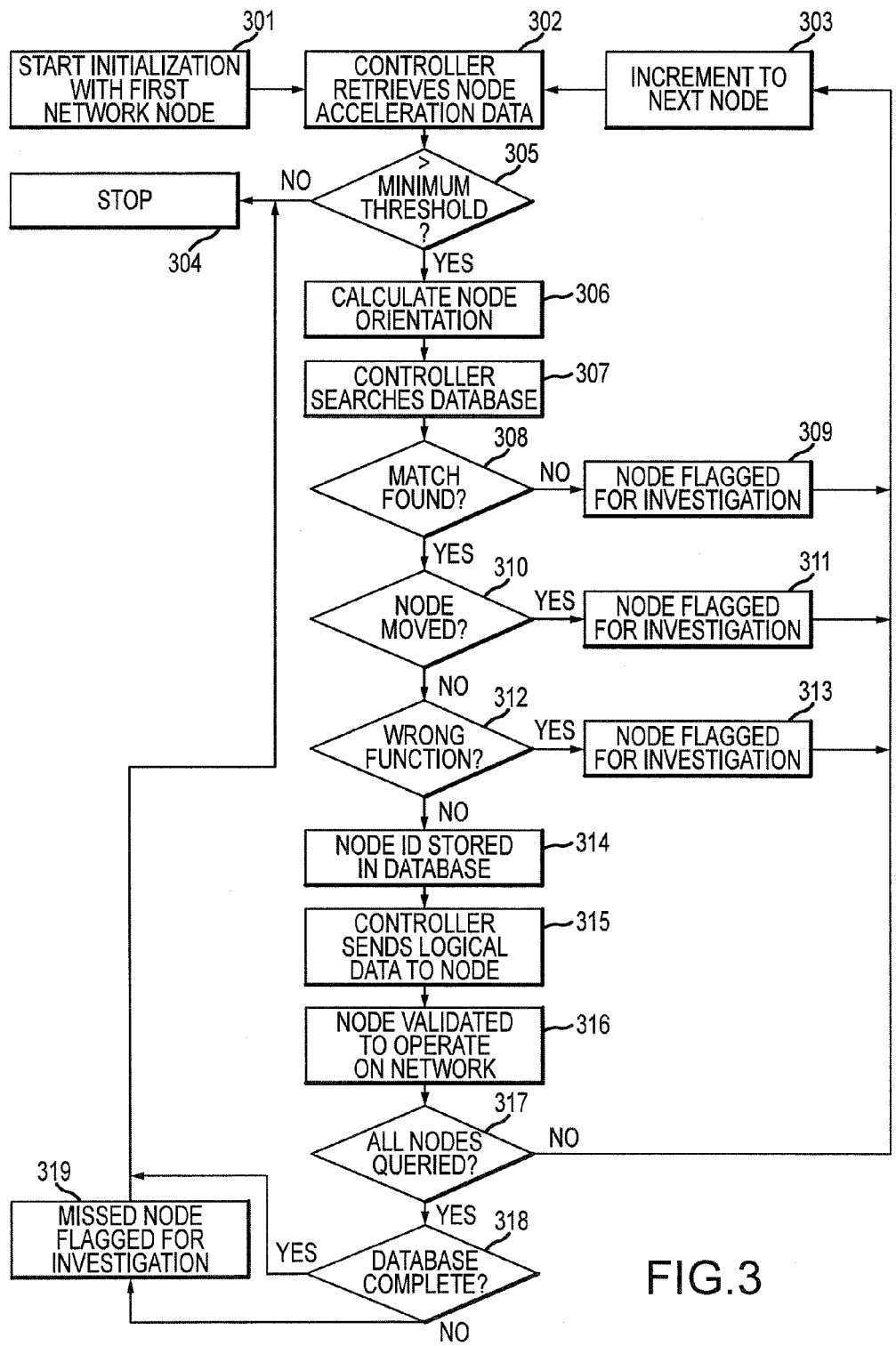
FIG. 3 illustrates, in accordance with various embodiments, a method for identifying the physical location of a network node and thereby, mapping in a database, a node to its logical function.

During an initialization stage and with respect to FIG. 3, the controller 202 may construct the database as shown above. For example, during initialization (step 301), the controller 202 may receive an acceleration vector from each node 212 and/or 214 (step 302) to which an accelerometer 208 and/or 210 is coupled. The controller 202 may ensure that a minimum difference between the acceleration vector of a reference node and an acceleration vector of another node and/or variety of nodes exists (a threshold minimum) (step 305), and if it does not, the initialization process may be halted (step 304).

The controller 202 may calculate the node's orientation (step 306) by comparing the node's acceleration vector to the acceleration vector of the reference node and search the predetermined orientation values in the database (step 307) residing within the memory 206 for a match (step 308). When a match is found, the controller 202 may determine if the node has been moved improperly from a previous location (step 310) or if the node is not capable of performing the intended function at the identified location (step 312). If the node's orientation does not match any values in the database, has been moved improperly, or is the incorrect type for the location, the node may be flagged for further investigation by maintenance personnel (steps 309, 311 and 313, respectively). Otherwise the controller 202 may store the node ID in the database table in memory 206 (step 314). The controller 202 may send the Location ID and Logical Data to a node, such as the nodes 212 and/or 214 to be stored internally (step 315) for future reference until the next database initialization event.

In response to confirmation of node data in the database table in memory 206, the node may be validated to operate on the network (step 316). Only nodes that match the predetermined orientation values in the database residing within the memory 206 will be allowed to operate on the network. Additional data may be exchanged between nodes (e.g., nodes 212 and/or 214) and controller 202 to further authenticate the node(s) identity. Retrieval of data from network nodes may be done sequentially (step 303) and/or in parallel. Once all nodes have been queried (step 317), the database may be checked for completeness (step 318). If there are any nodes missing from the database, they may be flagged for maintenance investigation (step 319). In response to identification and storage of node data within the database, the initialization process may be considered complete (step 304).

Initialization of the database residing within the memory 206 may occur on demand of the controller 202 and through a message to one or more nodes 212 and/or 214. This may be required during assembly of new aircraft in the factory, after a maintenance or repair action, or to verify operational status of the network periodically to verify inventory and/or detect tampering. A minimum acceleration threshold may be used to validate the orientation data received from node 212 and/or 214, for example, in various embodiments, it may be necessary for an in individual to associate, within the memory 206, each Node ID with each respective location.

During operation (i.e., after the database is constructed), the controller 202 may further request that any node 212 and/or 214 report to the controller 202, at any time, a measured orientation, a node ID, and any additional data that identifies the logical function of the node (e.g., lighting) (steps 302 through 319). Accordingly and with reference now to FIGS. 4 and 5, several real-world examples are shown. These examples are merely illustrative of a system configuration. However, a variety of system configurations are possible.

Figure 4:
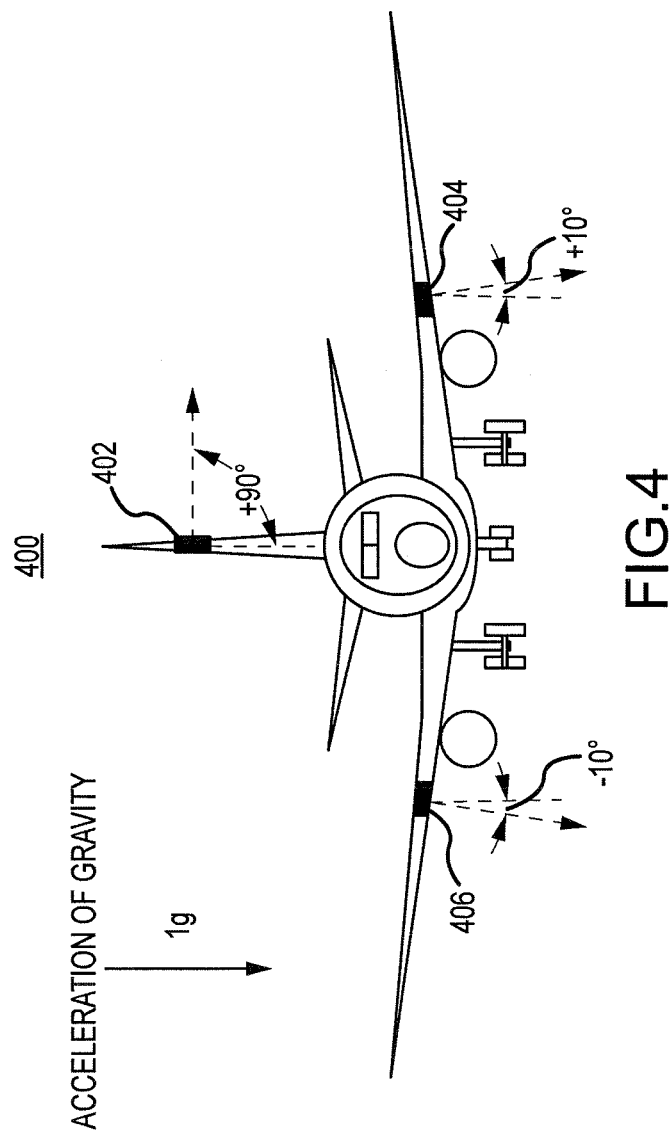
FIG. 4 illustrates, in accordance with various embodiments, a variety of network nodes with 3-axis accelerometers coupled to an aircraft stationary on the ground, wherein each accelerometer is offset in its orientation relative to each other accelerometer. Here the acceleration of gravity provides the common acceleration vector.

With respect to FIG. 4, then a variety of network nodes, e.g., accelerometers 402, 404, and/or 406 may be physically coupled to an object such as an aircraft 400. Each accelerometer 402, 404, and/or 406 may be oriented differently in space (as described above), and, during an initialization stage, the location and orientation of each accelerometer relative to the force of gravity stored by the memory 206. For instance, as shown, an accelerometer 402 may be oriented −90 degrees relative to the force of gravity. The controller may recognize, e.g., based upon a table as shown with respect to the table above, that the accelerometer associated with an orientation of −90 degrees relative to the force of gravity is association with a location of a first node. Similarly, the accelerometers 402 and/or 406 (or nodes associated with these accelerometers) may be associated with orientations of +10 degrees and −10 degrees relative to the force of gravity, and the controller 202 may thereby, with a table, determine the location of each node/accelerometer.

Figure 5:
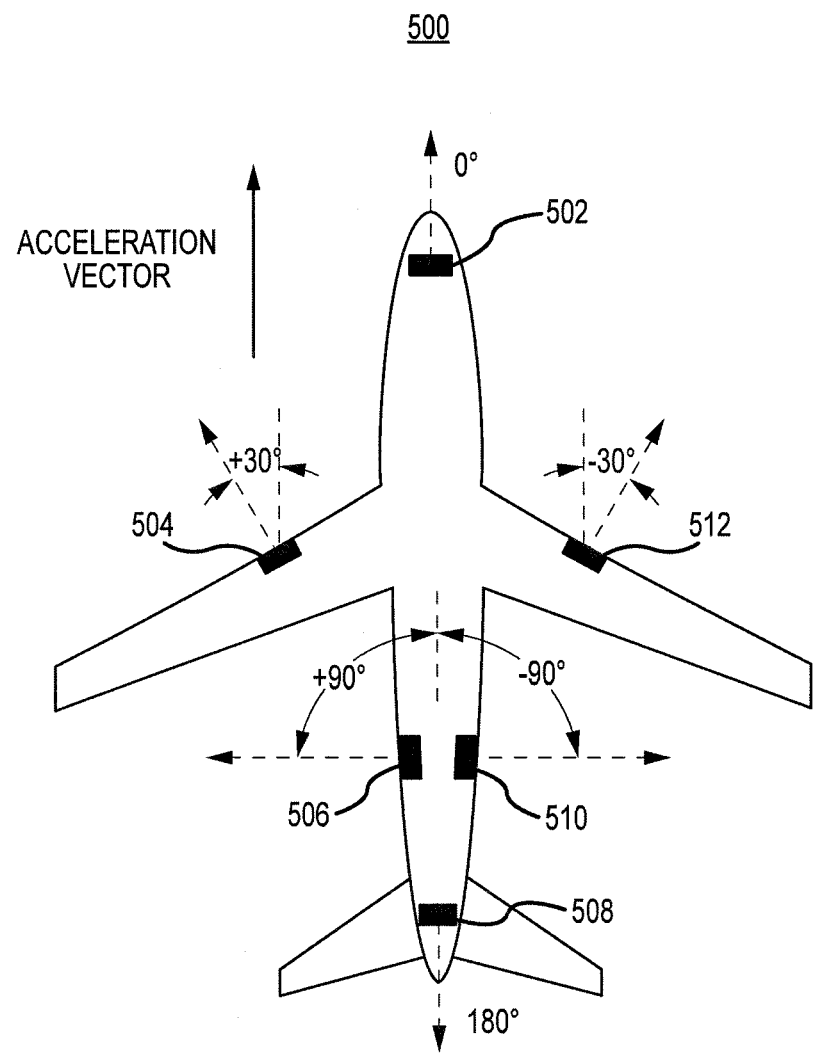
FIG. 5 illustrates, in accordance with various embodiments, a variety of network nodes with 3-axis accelerometers coupled to an aircraft, wherein each accelerometer is offset in its orientation relative to each other accelerometer. Here the forward acceleration of the aircraft may provide the common acceleration vector.

In like manner, and with reference to FIG. 5, a variety of network nodes, e.g., accelerometers 502, 504, 506, 508, 510, and/or 512, may be physically coupled to an object such as an aircraft 500. Each accelerometer 502, 504, 506, 508, 510, and/or 512 may be oriented differently in space (as described above), and, during an initialization stage, the location and acceleration vector of each accelerometer relative to an acceleration vector of the aircraft 500 (as opposed to an acceleration of gravity) may be stored by the memory 206.

During operation, the controller 202 may wirelessly receive acceleration vector data output by each accelerometer 502, 504, 506, 508, 510, and/or 512, and, based on the stored acceleration vector of each accelerometer 502, 504, 506, 508, 510, and/or 512 (as in the table above) and the received acceleration vector of each, determine the location of each accelerometer 502, 504, 506, 508, 510, and/or 512 and/or nodes associated with, coupled to, and/or co-located with each. For instance, as with the accelerometer 504, the controller 202 may receive an acceleration vector of +30 relative to the acceleration of the aircraft during operation, and based upon data stored in the lookup table or database, determine that the node associated with +30 (irrespective of the magnitude of the vector, which may vary with the acceleration of the aircraft) is associated with a particular node and/or node location and/or logical function.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for evaluating a physical location of a node in a network within an aircraft comprising:
   a reference node having a reference accelerometer installed in a reference orientation;
   a first node accelerometer coupled to a component and installed at a first location and in a first node orientation relative to the reference orientation;
   a memory configured to store the first node orientation and an initial acceleration vector of the first node accelerometer; and
   a controller configured to receive a current node acceleration vector associated with the first node accelerometer and a current reference acceleration vector associated with the reference accelerometer, determine a current node orientation by comparing the current node acceleration vector to the current reference acceleration vector, and to determine whether a current orientation of the component relative to the reference node has changed by comparing the first node orientation and the current node orientation.

2. The system of claim 1, wherein the controller is further configured to request at least one of an identifier associated with the node, a logical function of the node, or an acceleration vector of the first node accelerometer.

3. The system of claim 1, wherein the controller is further configured to develop a map of a plurality of locations of a plurality of nodes within a network.

4. The system of claim 1, wherein the controller is further configured to determine that a node has been at least one of damaged or moved based on whether the current orientation of the component relative to the reference node has changed.

5. The system of claim 1, wherein the memory is further configured to store a logical function of the node.

6. The system of claim 1, wherein the first node accelerometer is further configured to measure its acceleration vector relative to the force of gravity.

7. The system of claim 1, wherein the first node accelerometer is configured to measure the current node acceleration vector relative to a motion of an object to which it is mechanically coupled.

8. The system of claim 1, further comprising a plurality of accelerometers, each mounted in a unique spacial orientation relative to the remaining accelerometers of the plurality of accelerometers.

9. The system of claim 1, wherein the first node accelerometer comprises a portion of the node.

10. The system of claim 1, wherein the acceleration vector is measured in comparison to an acceleration vector associated with the reference accelerometer.

11. The system of claim 1, wherein each accelerometer communicates wirelessly with the controller.

12. The system of claim 1, wherein each node communicates wirelessly with the controller.

13. The system of claim 1, wherein the controller is further configured to receive at least one of an identifier associated with the node, a logical function of the node, or an acceleration vector of the accelerometer.

14. The system of claim 1, wherein the controller is further configured to:
   search the memory to determine if the current node orientation matches any of a plurality of stored node orientations;
   flag the node for investigation if the current orientation of the component relative to the reference node has changed; and
   flag the node for investigation if the current node orientation does not match any of the plurality of stored node orientations.

15. The system of claim 14, further comprising a plurality of nodes and wherein the controller is configured to perform all of the functions for each of the plurality of nodes.

16. A method for use with a network of an aircraft comprising:
   storing, by a memory coupled to a controller, a physical location of a first node accelerometer;
   storing, by the memory, a first node orientation relative to a reference orientation of a reference node;
   storing, by the memory, an initial node acceleration vector of the first node accelerometer;
   receiving, by the controller, a current node acceleration vector of the first node accelerometer;
   receiving, by the controller a current reference acceleration vector of the reference node,
   determining, by the controller, a current node orientation by comparing the current node acceleration vector to the current reference acceleration vector; and
   determining, by the controller, whether a node associated with the accelerometer has moved from the physical location based on a comparison of the current node orientation to the first node orientation.

17. The method of claim 16, further comprising:
   searching, by the controller, the memory to determine if the current node orientation matches any of a plurality of stored node orientations;
   flagging, by the controller, the node for investigation if the current orientation of the component relative to the reference node has changed; and
   flagging, by the controller, the node for investigation if the current node orientation does not match any of the plurality of stored node orientations.

* * * * *